(12) United States Patent
Ehlers et al.

(10) Patent No.: US 8,695,271 B1
(45) Date of Patent: Apr. 15, 2014

(54) FISHING LINE TROLLING RELEASE MECHANISM

(76) Inventors: John W. Ehlers, Duluth, MN (US);
Randolph A. Lasky, Duluth, MN (US)

( * ) Notice: Subject to any disclaimer, the term of this patent is extended or adjusted under 35 U.S.C. 154(b) by 1669 days.

(21) Appl. No.: 11/761,666

(22) Filed: Jun. 12, 2007

Related U.S. Application Data (60) Provisional application No. 60/814,478, filed on Jun. 16, 2006.

(51) Int. Cl.
*A01K 91/04* (2006.01)

(52) U.S. Cl.
USPC .......................................... 43/42.74; 43/43.12

(58) Field of Classification Search
USPC .............. 43/4, 4.5, 42.74, 43.1, 43.12, 43.13, 43/43.14
See application file for complete search history.

(56) References Cited

U.S. PATENT DOCUMENTS

| | | | |
|---|---|---|---|
| 2,170,594 A | 8/1939 | Nicholson | |
| 2,957,267 A * | 10/1960 | Dempsey | 43/44.88 |
| 2,988,395 A * | 6/1961 | Rogers | 294/82.35 |
| 3,037,317 A | 6/1962 | Morrison | |
| RE25,650 E | 10/1964 | Strumpf | |
| 3,193,964 A | 7/1965 | Hurst | |
| 3,357,126 A | 12/1967 | Klieves | |
| 3,507,068 A | 4/1970 | Roberts | |
| 3,778,918 A | 12/1973 | Emory, Sr. et al. | |
| 3,786,595 A * | 1/1974 | Croce | 43/44.87 |
| 3,800,458 A | 4/1974 | Swanby | |
| 3,816,954 A | 6/1974 | Bissonette | |
| 3,835,573 A | 9/1974 | Borchardt | |
| 3,839,813 A | 10/1974 | DeSmidt et al. | |
| 3,874,110 A | 4/1975 | Larson | |
| 3,892,083 A | 7/1975 | Peterson | |
| 3,898,759 A | 8/1975 | Jensen | |
| 3,905,148 A | 9/1975 | Naone et al. | |
| 3,925,920 A | 12/1975 | Walker | |
| 3,930,330 A | 1/1976 | Black | |
| 3,961,437 A | 6/1976 | Lewis | |
| 3,968,587 A | 7/1976 | Kammeraad | |
| 4,012,863 A | 3/1977 | Lori | |
| 4,015,362 A | 4/1977 | Johnson | |
| 4,221,068 A | 9/1980 | Roemer | |
| 4,282,672 A * | 8/1981 | Neary | 43/43.13 |
| 4,398,368 A * | 8/1983 | Nishi | 43/15 |

(Continued)

OTHER PUBLICATIONS

Product display, assorted releases featured in a Cabela's catalog, estimated year of publication 2006 or earlier.

(Continued)

*Primary Examiner* — David Parsley
(74) *Attorney, Agent, or Firm* — Dicke, Billig & Czaja, PLLC (57) ABSTRACT

A fishing line trolling release mechanism. One embodiment is for use with a surface planer board line; another embodiment is for use with an underwater depth controlled downrigger-trolling cable and weight system. In either embodiment, the mechanism reduces or eliminates slack line, which results in more consistent hookups while retaining unhindered fish playing ability. The embodiment for board line release is snapped on the planer board line that slides out to the desired distance from the boat. The embodiment for downrigger release is snapped around the downrigger cable, then lowered to the desired depth by the rod and reel, employing a rotating diving and return plate to controls the depth of the combination prior to and after the fish strike.

16 Claims, 7 Drawing Sheets

(56) References Cited

U.S. PATENT DOCUMENTS

| | | | |
|---|---|---|---|
| 4,411,395 A | 10/1983 | Steffens | |
| 4,453,336 A | 6/1984 | Lowden | |
| 4,494,334 A * | 1/1985 | Porter | 43/43.12 |
| 4,538,372 A | 9/1985 | Petigoretz | |
| 4,565,026 A | 1/1986 | Bhome | |
| 4,574,518 A | 3/1986 | Shedd et al. | |
| 4,611,423 A | 9/1986 | Rupp | |
| 4,628,630 A | 12/1986 | Bohme | |
| 4,656,776 A | 4/1987 | Macachor | |
| 4,696,124 A | 9/1987 | Wille | |
| 4,698,933 A | 10/1987 | Shaw | |
| 4,700,505 A | 10/1987 | Weber | |
| 4,733,492 A | 3/1988 | Thompson | |
| 4,809,457 A | 3/1989 | Macachor | |
| 4,813,172 A | 3/1989 | McCue | |
| 4,825,583 A | 5/1989 | Kammeraad | |
| 4,872,281 A | 10/1989 | Burgess | |
| 4,879,834 A | 11/1989 | Bohme | |
| 4,905,401 A | 3/1990 | Fukumoto | |
| 4,945,670 A | 8/1990 | Wetherald | |
| 4,974,359 A * | 12/1990 | Zajic | 43/27.4 |
| 5,033,226 A | 7/1991 | Jackson | |
| 5,107,616 A | 4/1992 | Ryder | |
| 5,163,246 A | 11/1992 | Shaw | |
| 5,177,894 A * | 1/1993 | Dunsford | 43/43.12 |
| 5,197,223 A | 3/1993 | Spurgeon | |
| 5,239,769 A | 8/1993 | Anderson | |
| 5,276,994 A | 1/1994 | Thompson et al. | |
| 5,337,510 A | 8/1994 | McCue | |
| 5,417,008 A | 5/1995 | Smith | |
| 5,495,691 A | 3/1996 | Kelsala | |
| 5,608,986 A | 3/1997 | Spurgeon et al. | |
| 5,784,826 A | 7/1998 | Walker | |
| 5,826,365 A | 10/1998 | Stroobants | |
| 5,867,932 A | 2/1999 | Reiger | |
| 5,921,015 A | 7/1999 | Newell et al. | |
| 5,979,104 A | 11/1999 | Walker | |
| 6,018,903 A | 2/2000 | Miralles | |
| 6,192,619 B1 | 2/2001 | Pirkle | |
| 6,314,673 B1 * | 11/2001 | Matteoli | 43/43.12 |
| 6,634,136 B2 | 10/2003 | Barrett et al. | |
| 6,964,242 B1 | 11/2005 | Donahue | |
| 2004/0206288 A1 | 10/2004 | Wilcox et al. | |
| 2004/0237377 A1 | 12/2004 | Tipping | |
| 2004/0244270 A1 | 12/2004 | Brinker et al. | |
| 2005/0000146 A1 | 1/2005 | Link | |
| 2005/0102885 A1 | 5/2005 | Albrant, Jr. | |
| 2006/0016117 A1 | 1/2006 | Aanenson | |
| 2006/0086035 A1 * | 4/2006 | Chamberlain | 43/43.12 |

OTHER PUBLICATIONS

Gnatkowski, Mike, "Lake Michigan Downrigger Tricks", gameandfishingmag.com, original on-line publication date estimated to be Nov. 13, 2004.

Screen print from www.offshoretackle.com May 30, 2007.

* cited by examiner

FISHING LINE TROLLING RELEASE MECHANISM

CROSS-REFERENCE TO RELATED APPLICATION

The application claims the benefit of U.S. Provisional Application 60/814,478 filed Jun. 16, 2006.

FIELD OF THE INVENTION

This invention concerns accessories for fishing, particularly accessories for use with a positioning line, i.e., a line that does not carry a fishing lure but instead is used to position the fishing line (that does carry the fishing lure) in the water. Examples of such positioning lines are a surface planer board line and an underwater depth-controlled downrigger-trolling cable and weight system.

BACKGROUND OF THE INVENTION

One method of fishing is known as the planer board system. In this method, a planer board is sent out from the side of the boat on the surface of the water. A positioning line secures the planer board to the boat. The positioning line angles out from the boat approximately 80 degrees from the direction of forward travel of the boat. The fishing lines are then attached with a release mechanism to the positioning line, and slid out that line to the desired distance away from the boat.

Another method of fishing is known as downrigger fishing. In this method, a downrigger cable serves as the positioning line, and it extends straight downward in the water from a boat on the surface. The cable includes a heavy (typically but not necessarily lead) weight at the end of the cable to keep the line vertical in the water while the boat moves forward for trolling. A fishing line from a fishing rod on the boat extends downward along the downrigger cable. The fishing line is attached in a releasable way to the cable at a desired depth below the surface of the water by some sort of conventional release mechanism.

In either case, when a fish strikes the hook on the fishing line, it pulls the fishing line free of the release mechanism. Suddenly, many feet of slack are in the line. For example, a typical total fishing line length may be approximately sixty feet, thirty feet from the end of the fishing rod to the release mechanism along the positioning line, and another thirty feet from the mechanism to the hook. This makes the shortest distance to the hook (i.e., the hypotenuse of the triangle) approximately forty-two feet. When the fish strikes and pulls the line away from the release mechanism, suddenly approximately eighteen feet of slack line is created. The slack line can provide the fish with enough play in the line to escape the hook. At a minimum, it takes the fisherman several (typically frantic) seconds to reel in the slack line, all the while attempting to keep the line taught so the fish will not escape.

While various devices to reduce the amount of slack line are in the prior art, there is a need for an improved downrigger and board line release apparatus that prevents the slack line, and thus results in more consistent retention of fish on the hook, and thus improved ability to play with the retained fish.

SUMMARY OF THE INVENTION

The invention is an improved fishing line release system for a positioning line, particularly for planar board line or downrigger cable situations. The invention may be achieved in several embodiments. In general terms, the invention comprises a feature that enables it to slide along the positioning line, such as a loop or other opening that surrounds the downrigger line or board line. This enables the invention to slide along that line to the desired depth (in the downrigger embodiment) or to the outboard position (in the planar board embodiment).

Combined with that feature is a release mechanism for releasably holding the fishing line in position before the fish strikes. The release mechanism enables the fishing line to extend in the aft direction from the system, so that when the fish strikes and the release mechanism releases the fishing line (suddenly creating slack in the line), the pull of the fish (as well as the forward motion of the boat, if any) moves the fishing line in the aft direction.

A hook may be included in the combination so that the apparatus retains the fishing line after it is released from the release mechanism. There is a relatively small amount of distance between the release mechanism and the hook, which enables the fishing line to be almost immediately captured by the hook without risk that the slack in the fishing line will enable the fishing line to escape entirely. The near-immediate catching of the fishing line by the hook ensures that the slack in the line is not created, i.e., the fishing line is quickly "re-caught" after it is released in almost exactly the same position as it was in. Thus, the sudden creation of slack line is effectively eliminated. As opposed to the release mechanism, the hook allows the fishing line to be reeled in (i.e., as the fish is played). Once the fish is near the surface, the fishing line may be easily released from the hook and the fish played or caught in a conventional manner.

Such a hook is required when the invention is applied to a planer board line. However, when a swiveling diver plate is included in a downrigger and cannon ball line embodiment, the hook could be omitted and the embodiment could still function in a way that the fisherperson would not have to raise and lower the cannonball to connect their line. Moreover, this embodiment can be set or lowered to a position anywhere along the downrigger line or cable. This enables the fisherperson to stack more than one release along the vertical line or cable. A similar situation applies to an embodiment of the invention having both a swivel board and a hook. In this situation, it is possible to stack a second apparatus above the first apparatus on the same cable. The fisherperson raises the higher stacked apparatus to allow the lower one to travel up the cable as one plays the fish. Thus, when a fish strikes, they simply immediately bring up the higher of the stacked apparatus to the surface to avoid line tangle. When the lower apparatus has traveled upward to near the surface, the line is dislodged from the hook and the fish is played.

BRIEF DESCRIPTION OF THE DRAWINGS

The accompanying drawings illustrate the principles of the invention in the context of particular embodiments of the invention. Thus, such embodiments are examples, and they are not intended to limit the scope of the invention except as specifically stated further below.

FIGS. 3 and 4 are schematic diagrams of another embodiment of the invention as used in a downrigger application, before the fish has struck. FIG. 3 is a side view and FIG. 4 is a top view.

FIGS. 5 and 6 are schematic diagrams of the embodiment of FIGS. 3-4 after the fish has struck. FIG. 5 is a side view and FIG. 6 is a top view.

FIGS. 7 and 8 are each sets of six primary views (top, bottom, left, right, front, and back) of an embodiment of the invention. FIG. 7 illustrates the embodiment when latched and FIG. 9 illustrates the embodiment when unlatched.

DETAILED DESCRIPTION

Planer Board Embodiment

Figure 1:
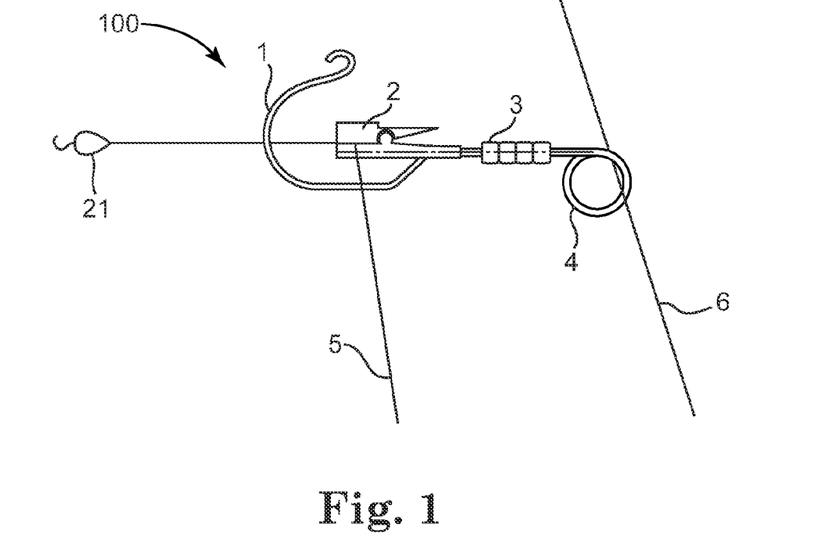
FIGS. 1 and 2 are schematic diagrams of one embodiment of the invention as used in a planar board application, before the fish has struck (FIG. 1) and after the fish has struck (FIG. 2).
Figure 2:
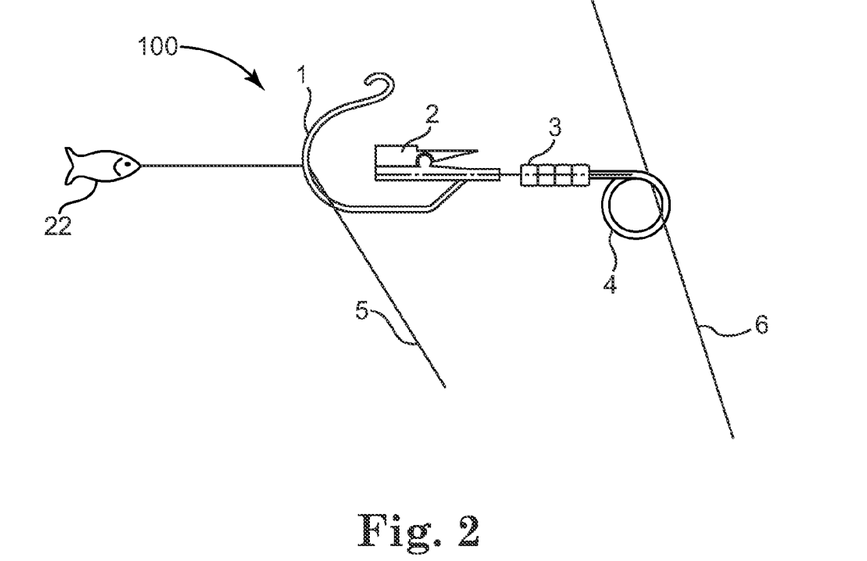
Figure 3:
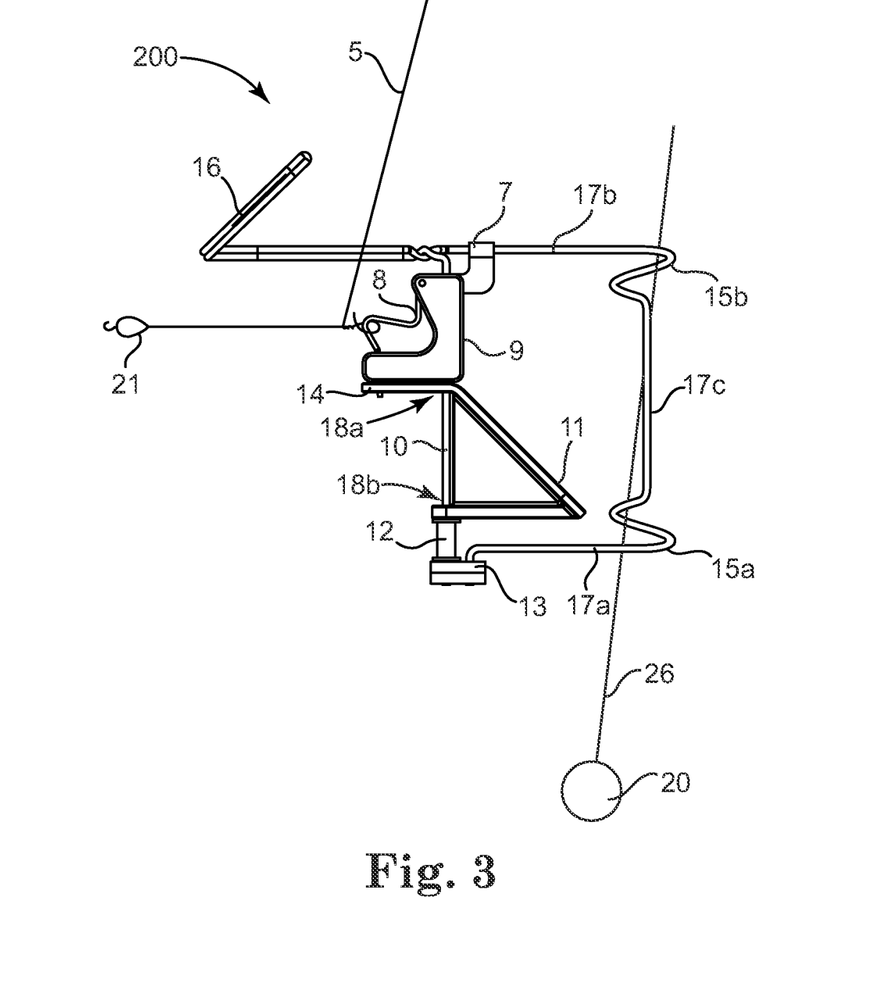
Figure 4:
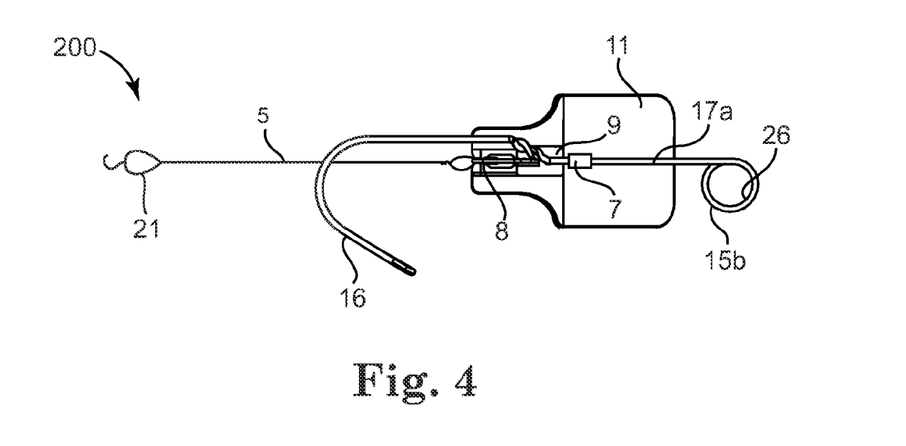

Referring specifically to FIGS. 1 and 2, the embodiment of the invention that is indicated generally as 100 is adapted for use with a planer board (not shown). It comprises a hook 1 that is generally C-shaped and lies with its convex closed end directed aft of the invention when in use. (The hook is optional depending on whether the embodiment of the apparatus is used with a planer board line or a cannonball line, as described further below.) The hook 1 is combined with a release mechanism 2 that generally lies adjacent the concave opening to the interior of the C-shaped hook mechanism 1; it is preferred that release mechanism 2 generally within the concave opening, so as to reduce the distance between the two components. The release mechanism is directed aft, i.e., into the interior of the hook 1. An optional identifier member 3 connects hook 1 and release mechanism 2 to a loop 4 that is positioned on the forward end of optional identifier 3. The optional identifier member 3 is a visual aid for ease of positioning the board release.

The embodiment of FIGS. 1 and 2 operates as follows. First, the fishing line 5 is set in the release portion 2 of the device 10. When the fish 22 strikes the lure 21 at the far end of the fishing line 5, the fishing line 5 pulls free of the release 2 but stays in the hook 1, eliminating any slack in the fishing line 5 between the fish and the rod and reel. As the fishing line 5 is reeled in and the fish is played on the tight fishing line 5, the invention 10 travels back up the planar board line 6, because loop 4 slides along planar board line 6, to near the tip of the fishing pole. The fisherman simply moves the pole toward the board line 6, and the fishing line 5 will disengage from the hook 1, thus allowing the fish to continue to be played unhindered without any slack or loose fishing line 5. This tight fishing line 5 maintains the hook "set" in the fish, and provides for more consistent hookups and retained sets, while sustaining maximum fish playing ability.

In terms of construction, the hook 1 and loop 4 are preferably constructed of stainless steel wire. The release mechanism 2 is preferably a rubber jawed alligator clip. Other materials may be used if desired. It is preferred but not necessary for hook 1 and loop 4 to be constructed of the same material. As illustrated, a small back loop may be formed in hook mechanism 1 to prevent it from having a sharp or otherwise distinct end that may interfere with the insertion or removal of fishing line 5 into the interior of the C-shaped hook mechanism 1. This back loop is not a requirement of the invention but is highly desired to prevent the possibility of snagging or even cutting fishing line 5. The rubber jaws on the alligator clip prevent release mechanism 4 from gripping fishing line 5 so securely that fishing line 5 does not pull free from release mechanism 4 (only to be caught by hook 1) when the fish strikes.

The shapes of hook 1 and loop 4 as illustrated in the Figures are not critical to the scope of the invention provided the apparatus operates properly as described here. In particular, either or both may be other shapes besides the generally circular shapes shown for illustrative purposes only. Loop 4 could be spiral or helical so that it forms a closed shape when viewed from the top, or it could be a circle, oval, or other closed figure lying in the plane of the Figure. Similarly, it may be desirable for hook 1 to not only lie in the plane of Figure as illustrated, but to also have an upward component when viewed from the side.

Multiple fishing lines may be attached to a single planer board line by using multiple pieces of the invention. Two or three such fishing lines may be easily accommodated on a single planer board line. If this is done, the fisherman must reel in the lines closest to the boat first if a fish strikes on a fishing line that has been deployed farther out along the planer board line.

Downrigger Embodiment

Referring specifically to FIGS. 3-6, the embodiment of the invention that is indicated generally as 200 is adapted for use with a cannon ball line 26 (bearing a weighted cannon ball 20 that is usually 8 to 12 pounds). It comprises an optional (but illustrated as if required) hook 16 that is generally C-shaped when viewed from above and somewhat spiral shaped when viewed from the side. The convex closed end of hook 16 is directed aft of the invention when in use. The hook 16 is combined with a release mechanism 8, 9 that generally lies immediately adjacent the concave opening to the interior of the C-shaped hook 16. The release mechanism 8, 9 is directed to release fishing line 5 aft, i.e., into the interior of the hook 1, when release mechanism bail 8 opens away from release mechanism housing 9. A member 7 connects hook 1 and release mechanism housing 9 to a loop/extension combination 15*a-b*, 17*a-c* that is positioned forward from member 7.

Release mechanism housing 9 (which is attached to uppermost extension 17*b* by member 7) lies above the upper platform 14, which is notched to receive bail 8 of a pivotable angled planer board 11. Planer board 11 defines upper and lower holes 18*a*, 18*b* through which wire 10 passes, thus allowing planer board 11 to pivot entirely around wire 10. A spacer 12 and a connecting device 13 connect wire 10 and lowermost extension 17*a*. Upper and lower loops 15*a-b* are separated from each other by a vertical extension 17*c*. It is preferred that components 16, 17*b*, 15*b*, 17*c*, 15*a*, 17*a* and 10 be formed from a single continuous piece of stainless wire connected together with connecting device 13.

In use, the fishing lure 21 is set to the desired distance behind the boat and the fishing line 5 is attached to the release mechanism 8, 9. The invention 200 is looped around the cannon ball line 26 with hook/extension combination 15*a-b*, 17*a-c*. The use of two or more (as shown) multiple sub-loops 15*a-b* that are horizontally and vertically spaced away from each other (and from the other portions of this embodiment) by extensions 17*a-c* is a preferred embodiment only; in general, it is only necessary that the invention 200 be capable of freely sliding along cannon ball line 26 while remaining stable and allowing pivoting of the other components of the invention as described below. The use of vertically separated sub-loops 15*a-b* promotes such stability as opposed to use of a single loop or similar feature, which would tend to allow the apparatus to twist undesirably around the location of such a single loop. Sub-loop/extension combination 15*a-b*, 17*a-c* should remain stable (other than sliding along line 26) so that other components of the invention operate as designed.

For example, the planer plate 11 is initially angled to face forward, and thus cause the invention 200 to dive down to the depth set by the cannon ball 20. But when the fish strikes, the release mechanism 8, 9 (preferably, but not necessarily, being essentially similar to a commercial product known as a DuBro Release) frees the fishing line 5. This permits the planer plate 11 to pivot around hinge 12 and face aft. This causes the invention 200 to plane upward towards the surface along cannon ball line 26.

Figure 5:
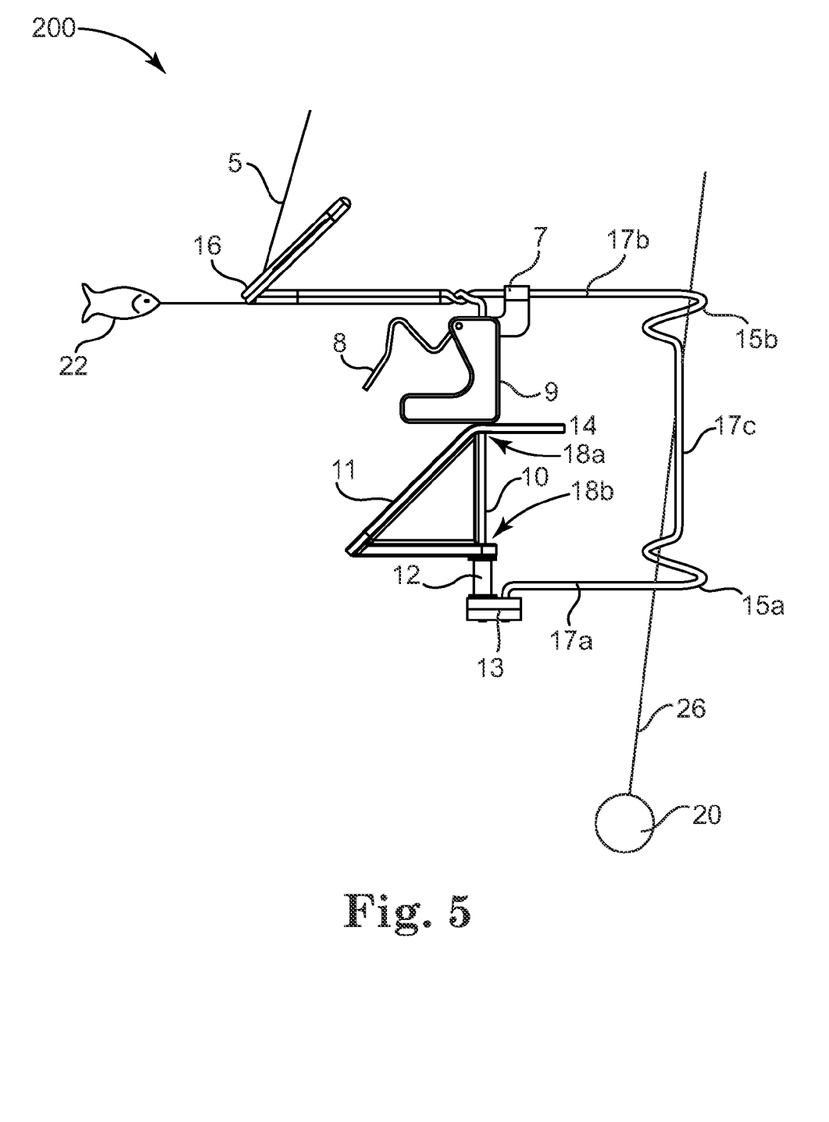
Figure 6:
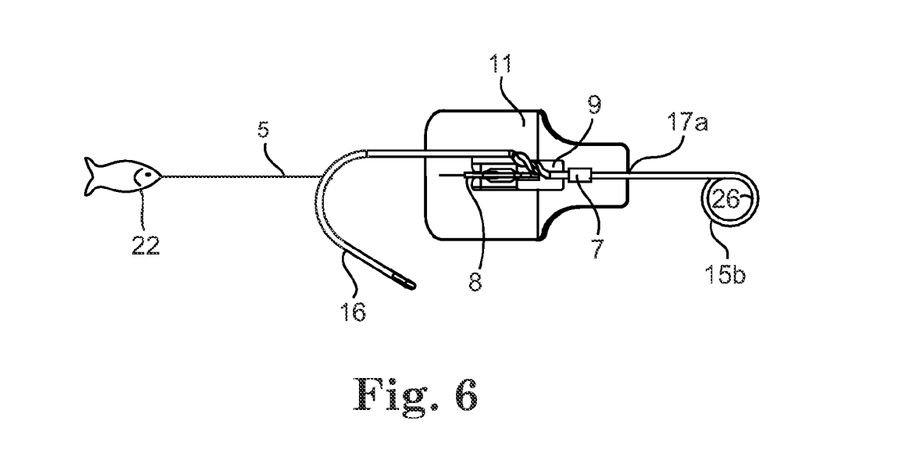
Figure 7:
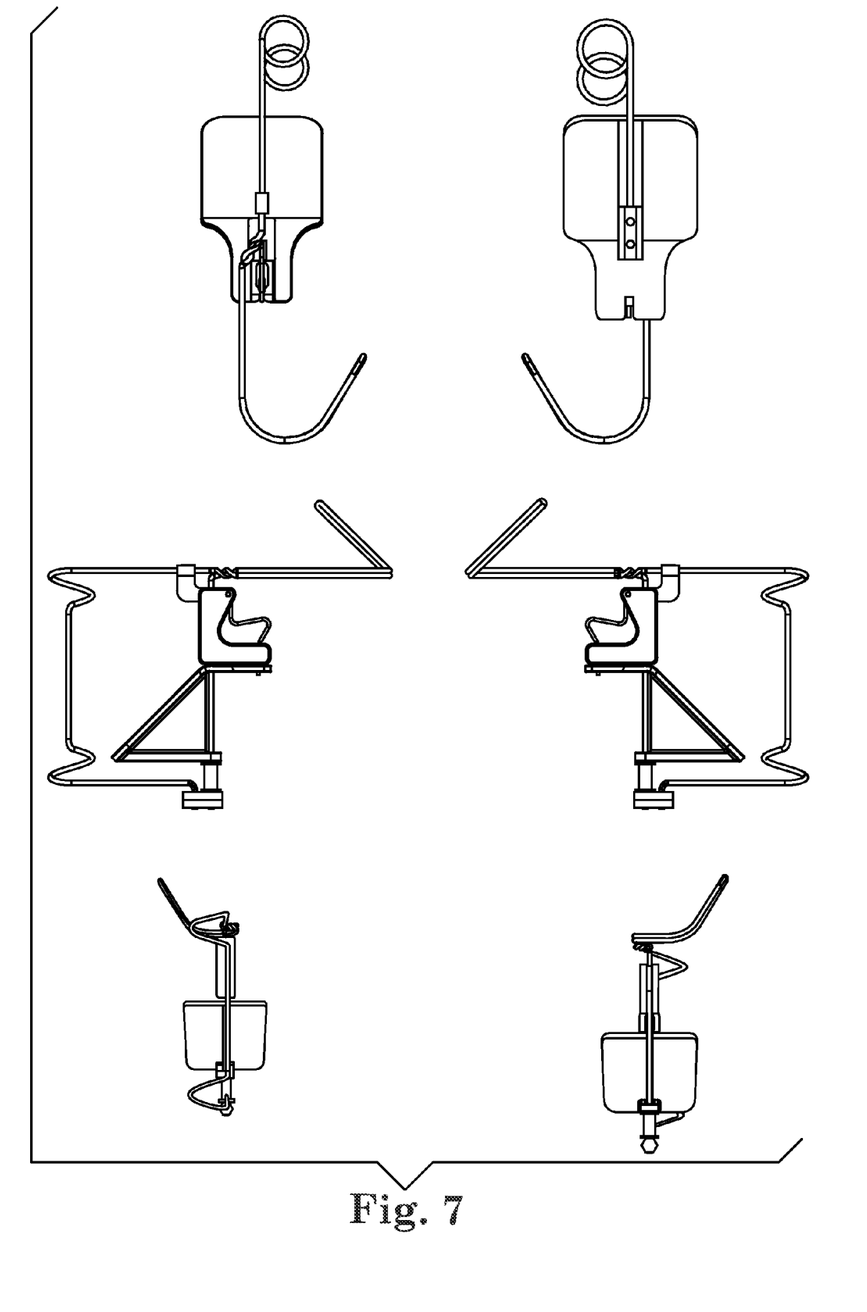
Figure 8:
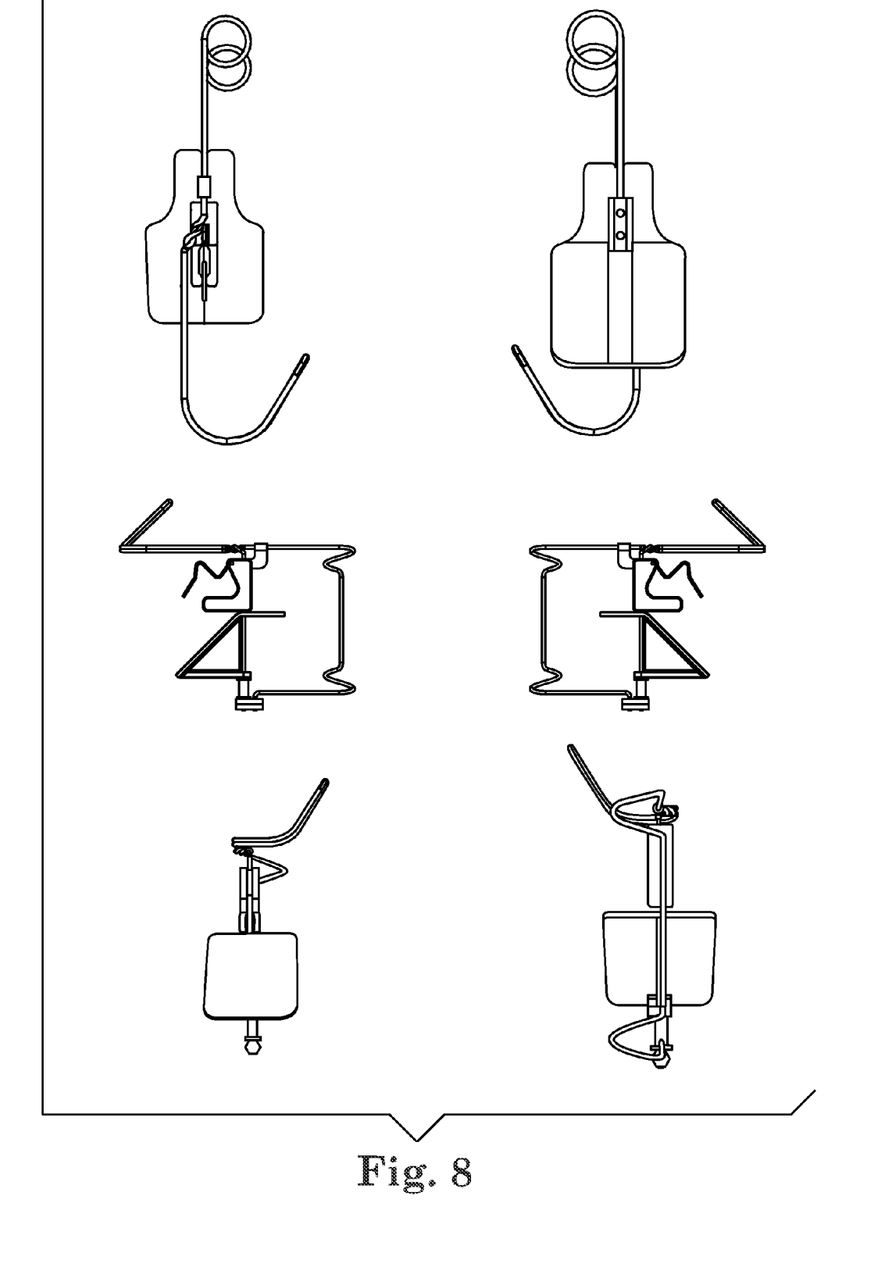
Figure 9:
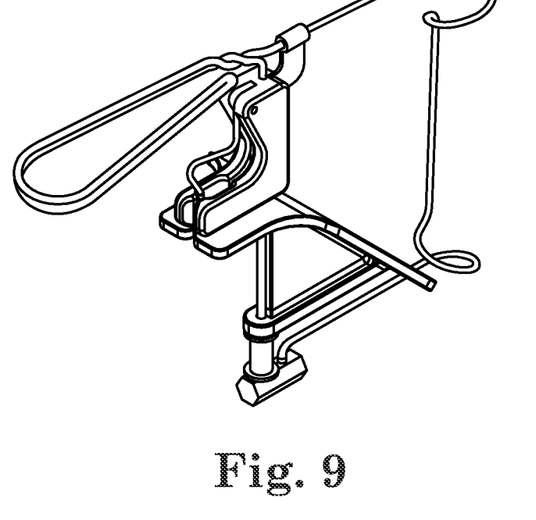
FIGS. 9 and 10 are each perspective views corresponding to FIGS. 7 and 8, respectively.
Figure 10:
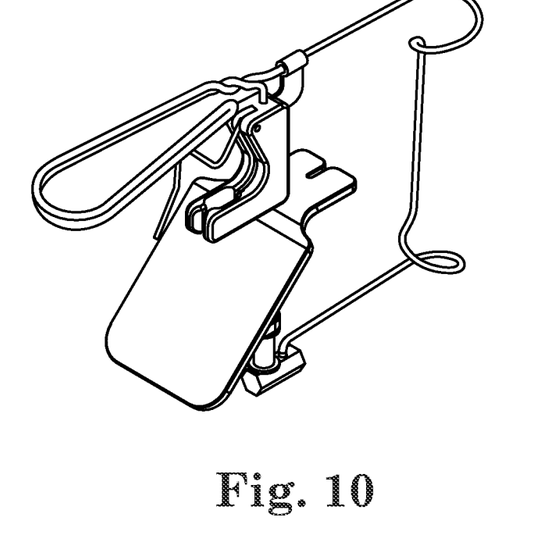

As this happens, the fishing line 5 is caught in the hook 16, preventing slack line, as described above, and the fish 22 may be reeled in. As with the prior embodiment, when the fish 22 is near the surface, the fishing line 5 is slid (or by itself slides) off the hook 16, becoming free and allowing the fisherman to continue to play and catch the fish 22.

The invention 200 has planed upward but is still on the cannon ball line 26, near the surface of the water, and thus it may be easily retrieved. The fishing line 5 may be reset in the release mechanism 8, 9 without raising the lead weight 20 and cannon ball line 26 to the surface.

As will be understood from the above, when optional hook 16 is not employed, the invention 200 could still function in a way that the fisherperson would not have to raise and lower the cannon ball line 26 to connect their fishing line 5. Moreover, the invention 200 can be set or lowered to a position anywhere along the downrigger cable. Thus, more than one apparatus may be placed along the vertical cannon ball line 26.

Comparison to Prior Art Embodiments

While other devices to address the problems of slack line exist, they may be distinguished from the invention. One such device is known commercially as the Laurvick Planer Board Release. It comprises a rubber-coated alligator clip for holding the fishing line, and a loop that may surround a positioning line. However, once the fish strikes, it has no means for preventing slack in the line from suddenly developing as described above.

Another such device is known as the Mac-Jac. It includes a release button which is snapped into and out of a spring clip which somewhat resembles a safety pin. The release button is similar to a small spool having a central aperture through which the fishing line passes, with the spring clip in a partial embrace around its circumference. The spring clip portion of this device rides freely up and down the downrigger cable and therefore requires additional means to position it at a desired point on the cable.

Another device used for releasable holding of a fishing line to a downrigger cable is the Auto-Trac 4-way rudder release. This device includes a plastic plate member attached to the downrigger cable. The plate member has a series of release notches of slightly graduated diameter to engage a release button or spool through which the fishing line passes. The release button can be set in any of four notches depending on the tension at which it is desired to release the fishing line.

Another device is known as a Roemer Release. It is a relatively complex mechanism. See U.S. Pat. No. 4,221,068, issued to Leonhard J. Roemer on Sep. 9, 1980 in which this device is fully described.

Another device is known as the Black Release I. This device includes a body member that is threaded onto a downrigger cable, and a release arm that is pivoted at one end to the body. The "free" end of the release arm is held in place between two jaws that are adjustably urged together by an adjusting screw. Sufficient tension on the fishing line, which passes under the release arm on its way to the lure, pulls the free end of the release arm free of the jaws in which it is set.

While all of these devices are generally directed to solving the same problem as the invention, none have the features of the invention, and therefore none adequately prevent slack in the line after the fish strikes the lure, nor do any result in more consistent hookups and retained fish playing ability.

Other Embodiments

The scope of the invention is not limited to the particular embodiments illustrated in the Figures and described above, which illustrate only preferred embodiments. For example, the scope of the invention includes embodiments for other types of fishing, or embodiments employing other parts operating according to the same principles, and thus the scope of the invention is limited only by the following claims.

We claim:

1. An apparatus for attachment to a planar board line that prevents a fish strike from introducing slack into a fishing line, comprising in combination:
    a release mechanism that holds the fishing line prior to the fish strike and releases the fishing line afterward;
    a hook open in a forward direction towards the release mechanism, such that the fishing line is caught within the hook after the fish strike; and
    a loop that enables the apparatus to travel along the planar board line as the fishing line is shortened, thereby preventing slack from being introduced into the fishing line.

2. The apparatus of claim 1, further comprising a pivoting board to enable the apparatus to change depth after the fish strike.

3. The apparatus of claim 2, in which the pivoting board comprises an angled plane surface.

4. The apparatus of claim 2, in which the pivoting board comprises an upper platform located below the release mechanism.

5. The apparatus of claim 1, in which the loop comprises multiple sub-loops each vertically separated from each other.

6. The apparatus of claim 1, in which the hook is one of C-shaped or spiral shaped.

7. The apparatus of claim 1, in which the release mechanism lies immediately adjacent an open end of the hook.

8. The apparatus of claim 1, in which the release mechanism comprises a combination of a bail and a housing.

9. An apparatus for attachment to a cannon ball line that prevents a fish strike from introducing slack into a fishing line, comprising in combination:
    a release mechanism that holds the fishing line prior to the fish strike and releases the fishing line afterward;
    a pivoting board which rotates about a vertical axis passing through the board to enable the apparatus to change depth after the fish strike; and
    a loop that enables the apparatus to travel along the cannon ball line as the fishing line is shortened, thereby preventing slack from being introduced into the fishing line.

10. The apparatus of claim 9, further comprising a hook open in a forward direction towards the release mechanism, such that the fishing line is caught within the hook after the fish strike.

11. The apparatus of claim 10, in which the hook is one of C-shaped or spiral shaped.

12. The apparatus of claim 9, in which the pivoting board comprises an angled plane surface.

13. The apparatus of claim 9, in which the pivoting board comprises an upper platform located below the release mechanism.

14. The apparatus of claim 9, in which the loop comprises multiple sub-loops each vertically separated from each other.

15. The apparatus of claim 9, in which the release mechanism lies immediately adjacent an open end of the hook.

16. The apparatus of claim 9, in which the release mechanism comprises a combination of a bail and a housing.

* * * * *